(12) United States Patent
Schmidt et al.

(10) Patent No.: US 12,181,367 B2
(45) Date of Patent: Dec. 31, 2024

(54) METHOD AND DRIVETRAIN TEST BENCH FOR DETECTING AN IMBALANCE AND/OR A MISALIGNMENT

(71) Applicants: AVL LIST GMBH, Graz (AT); PIEZOCRYST ADVANCED SENSORICS GMBH, Graz (AT)

(72) Inventors: Martin Schmidt, Langen (DE); Lukas Quurck, Darmstadt (DE); Jakob Moder, Unzmarkt (AT)

(73) Assignees: AVL LIST GMBH, Graz (AT); PIEZOCRYST ADVANCED SENSORICS GMBH, Graz (AT)

( * ) Notice: Subject to any disclaimer, the term of this patent is extended or adjusted under 35 U.S.C. 154(b) by 227 days.

(21) Appl. No.: 17/629,308

(22) PCT Filed: Jul. 24, 2020

(86) PCT No.: PCT/AT2020/060278
§ 371 (c)(1),
(2) Date: Jan. 21, 2022

(87) PCT Pub. No.: WO2021/011982
PCT Pub. Date: Jan. 28, 2021

(65) Prior Publication Data
US 2022/0252478 A1    Aug. 11, 2022

(30) Foreign Application Priority Data

Jul. 25, 2019   (AT) .............................. A50674/2019
Sep. 12, 2019   (AT) .............................. A50797/2019
Sep. 20, 2019   (AT) .............................. A50813/2019

(51) Int. Cl.
*G01M 1/24*   (2006.01)
*G01M 1/08*   (2006.01)
*G01M 13/025*   (2019.01)

(52) U.S. Cl.
CPC ............... *G01M 1/24* (2013.01); *G01M 1/08* (2013.01); *G01M 13/025* (2013.01)

(58) Field of Classification Search
CPC ........ G01M 1/24; G01M 1/08; G01M 13/025; G01M 1/22; G01M 1/16; G01M 1/14
See application file for complete search history.

(56) References Cited

U.S. PATENT DOCUMENTS

| | | | | |
|---|---|---|---|---|
| 2,329,654 A | * | 9/1943 | Mar ......................... | G01M 1/22 73/475 |
| 2,346,975 A | * | 4/1944 | Laboulais ............... | G01M 1/22 29/27 R |

(Continued)

FOREIGN PATENT DOCUMENTS

| | | |
|---|---|---|
| CN | 1445521 | 10/2003 |
| CN | 201653705 | 11/2010 |

(Continued)

OTHER PUBLICATIONS

Official Action with Machine Translation for European Patent Application No. 20758098.6, dated Nov. 7, 2022, 9 pages.

(Continued)

*Primary Examiner* — Octavia Hollington
(74) *Attorney, Agent, or Firm* — Sheridan Ross P.C.

(57) ABSTRACT

The invention relates to a method and a drivetrain test bench for detecting an imbalance and/or a misalignment of at least one shaft assembly of a drivetrain during operation on a test bench, wherein a first piezoelectric force sensor is arranged in a flow of force generated by a transmission of power between a load unit of the test bench and a drive unit of the drivetrain or the test bench, and which is transmitted by of the shaft assembly, wherein the first force sensor realizes a first force measurement in a first plane and/or perpendicular to the first plane as is intersected by a rotational axis of the shaft assembly and preferably at least substantially perpen- (Continued)

Figure 1:
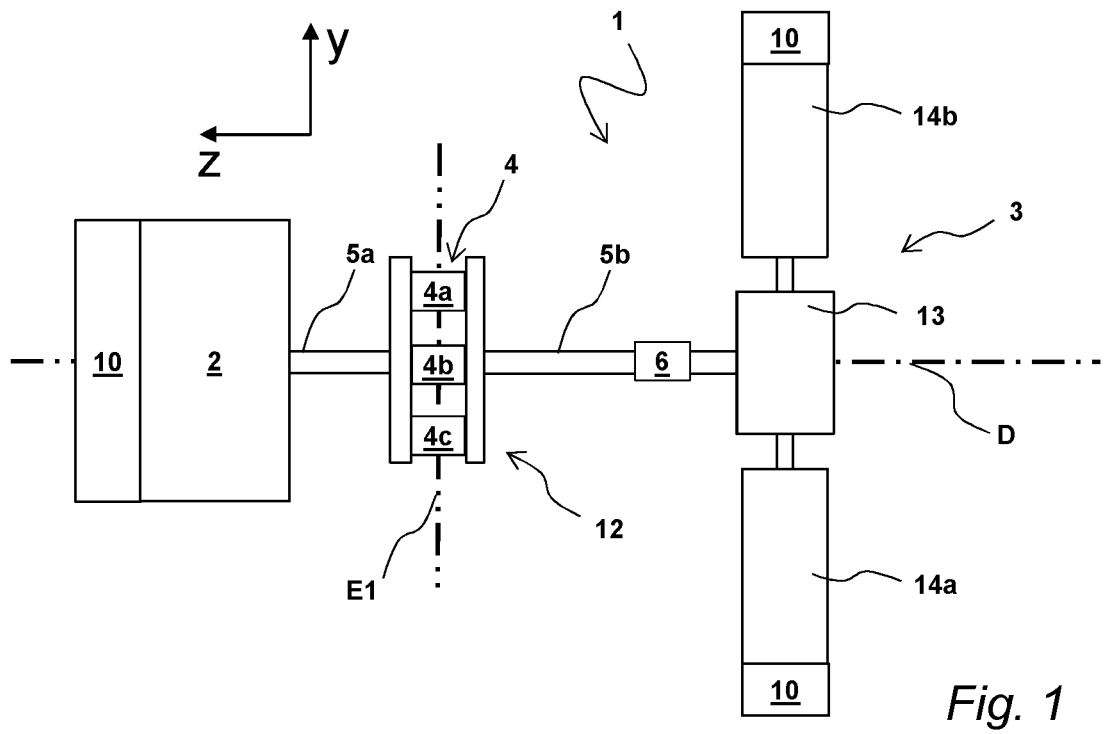

dicular to the rotational axis, and wherein the first force measurement and/or a rotational angle determination for the shaft assembly are used to detect an imbalance, and/or a misalignment of the shaft assembly.

26 Claims, 3 Drawing Sheets

(56) References Cited

U.S. PATENT DOCUMENTS

| | | | | |
|---|---|---|---|---|
| 5,329,823 | A | 7/1994 | Sonderegger et al. | |
| 5,659,136 | A * | 8/1997 | Koch | G01M 1/22 73/462 |
| 7,066,025 | B1 | 6/2006 | Corbin | |
| 8,443,659 | B2 * | 5/2013 | Mistral | G01M 1/04 73/116.04 |
| 10,052,740 | B2 * | 8/2018 | Trionfetti | G01M 1/22 |
| 11,852,545 | B2 * | 12/2023 | Schricker | G01L 3/108 |
| 2003/0115958 | A1 * | 6/2003 | Gregoretti | G01M 1/16 73/468 |
| 2006/0272420 | A1 | 12/2006 | Serrano | |
| 2011/0047711 | A1 | 3/2011 | Mistral et al. | |
| 2011/0226055 | A1 | 9/2011 | Rogalla et al. | |
| 2014/0033831 | A1 | 2/2014 | Matsumoto et al. | |
| 2016/0370247 | A1 * | 12/2016 | Lawson | G01M 1/06 |
| 2019/0195733 | A1 | 6/2019 | Stansloski et al. | |
| 2019/0212217 | A1 | 7/2019 | Haehnle et al. | |
| 2021/0190609 | A1 * | 6/2021 | Schricker | G01L 3/10 |

FOREIGN PATENT DOCUMENTS

| | | | |
|---|---|---|---|
| CN | 102706496 | 10/2012 | |
| CN | 103196594 | 7/2013 | |
| CN | 104390775 | 3/2015 | |
| CN | 104704336 | 6/2015 | |
| CN | 106370348 | 2/2017 | |
| DE | 102017122289 | 12/2017 | |
| EP | 0770860 | 5/1997 | |
| EP | 2503313 | 1/2016 | |
| EP | 4184139 A1 * | 5/2023 | ............. G01M 1/04 |
| FR | 2918453 | 1/2009 | |
| JP | H03-181835 | 8/1991 | |
| JP | H06-323943 | 11/1994 | |
| JP | H09-280991 | 10/1997 | |
| JP | 2004-117047 | 4/2004 | |
| JP | 2005-188951 | 7/2005 | |
| JP | 2005-189161 | 7/2005 | |
| JP | 2006-275637 | 10/2006 | |
| JP | 2011-007579 | 1/2011 | |
| JP | 2016-532102 | 10/2016 | |
| JP | 2018-009865 | 1/2018 | |
| JP | 2018-077216 | 5/2018 | |

OTHER PUBLICATIONS

International Search Report and Written Opinion for International (PCT) Patent Application No. PCT/AT2020/060278, dated Jan. 15, 2021, 15 pages.

English Translation of the International Search Report for International (PCT) Patent Application No. PCT/AT2020/060278, dated Jan. 15, 2021, 3 pages.

Official Action with English Translation for China Patent Application No. 202080052548.4, dated Sep. 23, 2023, 26 pages.

Official Action with Machine Translation for Japan Patent Application No. 2022-503866, dated Mar. 25, 2024, 8 pages.

Summons to Attend Oral Proceedings with Machine Translation for European Patent Application No. 20758098.6, dated Feb. 19, 2024, 18 pages.

Official Action with English Translation for China Patent Application No. 202080052548.4, dated Jul. 9, 2024, 16 pages.

* cited by examiner

METHOD AND DRIVETRAIN TEST BENCH FOR DETECTING AN IMBALANCE AND/OR A MISALIGNMENT

CROSS REFERENCE TO RELATED APPLICATIONS

This application is a national stage application under 35 U.S.C. 371 and claims the benefit of PCT Application No. PCT/AT2020/060278 having an international filing date of 24 Jul. 2020, which designated the United States, which PCT application claimed the benefit of Austria Patent Application No. A50674/2019 filed 25 Jul. 2019; Austria Patent Application No. A50797/2019 filed 12 Sep. 2019; and Austria Patent Application No. A50813/2019 filed 20 Sep. 2019, the disclosures of each of which are incorporated herein by reference in their entireties.

The invention relates to a method for detecting an imbalance and/or a misalignment of at least one shaft assembly of a drivetrain during operation on a test bench. The invention further relates to a test bench on which the method can be implemented.

Imbalances occur in a rotating body with a rotational axis not in correspondence with one of its principle axes of inertia. Imbalances lead to vibrations and increased wear or even to severe machine damage (e.g. shaft breakage). A rotating body is therefore commonly balanced by the positioning of a balancing mass.

A distinction is hereby to be made between a static imbalance and a dynamic imbalance, also called a couple unbalance. In static imbalance, the rotating body's principal axis of inertia is shifted parallel to the axis of rotation. In other words, the rotational axis does not run through the rotational body's center of mass. When rotating, this imbalance causes a centrifugal force perpendicular to the rotational axis. As a rule, such an imbalance can be eliminated by equilibrating in one plane, whereby the position of the balancing plane is arbitrary. To compensate static imbalance, balancing masses need to be set in at least one balancing plane.

In the case of a purely dynamic imbalance, while the rotating body's center of mass is on the axis of rotation, the rotating body's principal axis of inertia is tilted to the rotational axis. Unbalance torque thereby occurs during rotation, this occurring in the bearing force bearing points at the first harmonic order of the rotational body's rotational frequency. To compensate dynamic imbalance, balancing masses need to be set in at least two different balancing planes. Each balancing plane is thereby perpendicular to the rotational axis of the rotational body.

Misalignments result from assembly and production uncertainties, settling phenomena and thermal expansion leading to displacements of a rotating body. Such displacements have a detrimental effect on the function and operating life of the rotating body. Misalignments lead to tension forces, in particular bending moments and compressive forces on the rotating body and its bearing. Misalignments resulting from thermal expansion during operation can be determined during operation by means of the invention. Known methods of measuring misalignment are generally not used during operation and thus do not capture the dynamic thermal operating conditions.

Methods for static and dynamic balancing are known from the "Rotordynamik" textbook {"Rotordynamics"}, Gasch/Nordmann/Pfützner, Springer publishing, 2nd Ed., 1975, and the "Auswuchttechnik Band 1: Allgemeine Grundlagen, Meßverfahren and Richtlinien" textbook {"Balancing Technology, Vol. 1: General Principles, Measurement Methods and Guidelines"}, Springer 1977.

The task of the invention is that of providing a method for the detection and/or correction of an imbalance and/or misalignment of a shaft assembly of a drivetrain in operation on a test bench as well as a corresponding drivetrain test bench.

This task is solved by the independent claims. Advantageous embodiments are claimed in the subclaims.

A first aspect of the invention relates to a method for detecting an imbalance and/or a misalignment of at least one shaft assembly of a drivetrain in operation on a test bench, wherein a first piezoelectric force sensor is arranged in a flow of force generated by a transmission of power between a load unit of the test bench and a drive unit of the drivetrain or the test bench and which is transmitted by means of the shaft assembly. Preferably, the first force sensor realizes a first force measurement in a first plane and/or perpendicular to the first plane as is intersected by a rotational axis of the shaft assembly and preferably at least substantially perpendicular to the rotational axis. Further preferably, at least one measured value progression of the first force measurement and a value progression associated with the measured value progression of a shaft assembly rotational angle determination are analyzed in order to detect an imbalance. Alternatively or additionally, the measured value progression of the first force measurement is analyzed in order to detect a misalignment of the shaft assembly.

A second aspect of the invention relates to a drivetrain test bench with a load unit able to be connected to a drivetrain to be tested and a first piezoelectric force sensor which is arranged in a flow of force relative to the drivetrain to be tested and configured to realize a first force measurement in a first plane and/or perpendicular to the first plane as is intersected by a rotational axis of a shaft assembly of the drivetrain and preferably at least substantially perpendicular to the rotational axis during test bench operation. Preferably, the drivetrain test bench also comprises an incremental encoder configured to determine an angle of rotation for the shaft assembly as well as, further preferably, a signal processing device with means for detecting an imbalance in the shaft assembly on the basis of a measured value progression of the first force measurement and a value progression associated with the measured value progression of a shaft assembly rotational angle determination and/or means for detecting a misalignment of the shaft assembly on the basis of the measured value progression of the first force measurement.

Further aspects of the invention relate to a computer program and a computer-readable medium.

A shaft assembly within the meaning of the invention comprises one or more rotatably connected shafts.

"Connectable" within the meaning of the invention preferably means "can be connected" or "is/are connected."

A force flow within the meaning of the invention is preferably a path of force and/or torque in a mechanical system from a point of application, in particular a point of its introduction, to a point or plurality of points at which the force and/or torque is accommodated by a reactive force and/or a reaction moment. Preferably, the force flow is composed of a force, in particular a force transverse to the rotational direction of the shaft, and a torque, in particular about the rotational axis.

A power flow within the meaning of the invention is preferably is a power transmission path in a mechanical system from a point of its introduction to a point or plurality of points at which the power is drawn off.

A piezoelectric measuring element within the meaning of the invention preferably comprises a piezoelectric crystal as well as charge dissipation or an electrical connection respectively.

A machine unit within the meaning of the invention is configured to convert energy, preferably kinetic energy, particularly a rotation, into electrical energy or vice versa, or chemical energy into kinetic energy. A machine unit within the meaning of the invention preferably comprises a housing.

A support apparatus within the meaning of the invention is preferably an apparatus for supporting an element against a force acting on said element and/or a torque acting on said element. A support apparatus is preferably configured to provide a so-called reactive force or bearing reaction force respectively. A support apparatus within the meaning of the invention preferably serves to support the bearing apparatus. Preferably, the support apparatus is a bell housing, a housing of the drivetrain, or even a base plate.

Detection within the meaning of the invention is preferably a determining and/or quantifying and/or localizing and/or analyzing.

A means within the meaning of the invention can be designed as hardware and/or software, in particular as a particularly digital processing unit, in particular a microprocessor processing unit (CPU), preferably data or signal connected to a storage and/or bus system and/or which comprises one or more programs or program modules. The CPU can be designed to process commands which are implemented as a program stored in a storage system, acquire input signals from a data bus and/or provide output signals to a data bus. A storage system may comprise one or more, in particular different, storage media, in particular optical, magnetic, solid-state and/or other non-volatile media. The program can be designed so as to embody or be capable of realizing the methods described herein such that the CPU can execute the steps of such methods and thus in particular be able to detect an imbalance and/or misalignment.

An incremental encoder within the meaning of the invention can preferably determine individual angular segments and/or entire revolutions. In particular, the incremental encoder gives at least one pulse per revolution.

To be understood by balancing within the meaning of the present invention is an adjusting of the mass of the shaft assembly or of the drivetrain respectively. This can for example also denote a change in the mass distribution by, for example, turning a screw further in or out.

The invention is in particular based on the approach of balancing and aligning a shaft assembly of a drivetrain to be tested on a test bench on said test bench while the test bench is in operation. In particular, a shaft assembly does not then need to be separately balanced or aligned externally; i.e. off of the test bench, or by way of further measuring processes when at standstill or in balancing/alignment operation. The imbalance and/or misalignment is instead detected in a force flow directly generated by the test bench operation in which power transmission is induced between a load unit of the test bench, a so-called dyno, and a drive unit. For the force measurements required for balancing, the invention uses piezoelectric measuring elements which allow a particularly reliable measurement and add only minor elasticities to the vibratory system of the drivetrain due to their rigidity. Furthermore, the piezo elements, unlike acceleration sensors, enable directly measuring the forces and torques caused by an imbalance without needing to take the circuitous route of indirectly calculating the acceleration of masses first.

The invention enables the balancing of a shaft assembly in the assembled state and with all assembly uncertainties such as unequal screw weights, alignment errors, fitting tolerances and manufacturing imperfections such as eccentricity, asymmetry, density errors, etc., even without pre-balancing individual elements of the drivetrain. The method can thereby be used on a sustained basis to monitor the shaft assembly and in particular requires no additional measuring instruments not belonging to the test bench and can thus be executed during operation without interrupting test runs.

Due to the direct force measurement, no separate measurement runs are needed to determine the initial imbalance and the influencing coefficients by way of a test mass imbalance process.

Neither is any separate hardware such as accelerometers required for recording measurement data. The piezoelectric force sensors are preferably permanently installed in the test bench structure, whereby the measurement signal can be recorded physically unadulterated.

Since the physical "force" variable is determined directly, a conclusion can be drawn as to the detrimental effect on mechanical components. An empirical approach to assessing vibration velocities and a normative balancing quality class as regards the condition of machines is in principle not necessary. Based on the inventive determination of imbalances and misalignments, new standards for machine safety could therefore be developed.

If the shaft assembly's state of imbalance changes during operation, the invention enables already detecting it during test bench operation and being able to initiate countermeasures, for example via balancing actuators or an emergency stop or load reduction respectively, in order to prevent permanent damage to the drivetrain or the test bench.

While the forces and torques caused by the imbalance rotate at the rotational speed of the drivetrain in a case of misalignment, further spatially-fixed torques; i.e. not rotating at the rotational speed, occur in addition to the gravitational forces. The invention enables misalignments to be detected without additional vibration analyses.

Preferably, a balancing of the shaft assembly or drivetrain respectively ensues on the basis of the detection of the imbalance and/or misalignment in order to reduce or eliminate the detected imbalance/misalignment.

Adjustment of the mass in particular occurs in the form of removing or adding mass, in particular a prespecified mass, determined in particular from the detection of the imbalance and/or misalignment, at a position, in particular a predetermined position, of the shaft assembly or drivetrain respectively as particularly determined upon the detection of the imbalance and/or misalignment. In particular, the shaft assembly or the drivetrain comprises at least one element, which is preferably selectively introduced, from which material or respectively mass can be removed. The removal of material to balance an imbalance is also known as negative balancing. Removal can in particular entail milling, drilling, laser and the like.

In one advantageous embodiment of the method, the measured value progression of the first force measurement is analyzed in order to detect an imbalance relative to the rotational axis and/or a center of mass of the shaft assembly. When an analysis is performed of the force measurement in relation to the rotational axis, a static imbalance can be determined. When an analysis is performed in relation to the shaft assembly's centroidal axis (also called the principal axis of inertia), a purely dynamic imbalance can be determined. Preferably, both analyses can also be performed at the same time.

In a further advantageous embodiment of the method, a second force measurement is performed in a second plane, which differs from the first plane yet is likewise intersected by the rotational axis of a shaft assembly of the drivetrain and preferably at least substantially perpendicular to the rotational axis, via a second piezoelectric force sensor in the flow of force, whereby an imbalance of the shaft assembly relative to its centroidal axis or principal axis of inertia respectively is determined on the basis of a measured value progression of the second force measurement.

As already explained at the outset, a dynamic imbalance causes tilting moment about the center of mass of a shaft assembly. This tilting moment can be detected by measuring the force at a point in the force flow parallel to the rotational axis using a multi-component force sensor. The measurement therefore occurs in a first plane intersected by the rotational axis of a shaft assembly of the drivetrain. Moreover, there is the possibility of determining the tilting moment by performing the first force measurement in a first plane and a second force measurement in a second plane; i.e. a measurement of forces lying in the second plane. The two planes are thereby different from each other but are at least intersected by the shaft assembly's rotational axis and are preferably at least substantially perpendicular to the rotational axis.

In a further advantageous embodiment of the method, the first and/or second piezoelectric force sensor is a multi-component force sensor having multiple piezoelectric measuring elements. The use of a multi-component force sensor enables the determination of e.g. bending moments in the shaft assembly. Moreover, multiple piezo elements can be used to support, for example, the drive unit. To that end, three piezo elements can for example be arranged in three bearing points on a support apparatus of the load unit or drive unit.

In a further advantageous embodiment of the method, force components and torque components are determined by means of a set of equations on the basis of measurement signals of the piezoelectric measuring elements. Preferably, measurement signals of the individual piezoelectric measuring elements are broken down into portions contributing to the respective force components and/or torque components to be derived. Further preferably, particularly all the contributions of the individual piezoelectric measuring elements to the respective force components and/or torque components to be determined are taken into account.

Using a set of equations solved for the respective force components and/or torque components to be determined can factor in measurements of a plurality of piezoelectric measuring elements. Moreover, all the measurements of a multi-component force sensor, or its piezoelectric measuring elements respectively, can contribute a portion to the force components and/or torque components to be determined. Doing so in particular prevents force shunts from piezo elements not involved in a measurement.

In a further advantageous embodiment of the method, a mass of the shaft assembly is adjusted based on the imbalance and/or misalignment detection so as to reduce or eliminate the detected imbalance/misalignment. Using the detected imbalance/misalignment as the basis for determining the adjustment of the mass can in particular precisely determine at which position a defined mass should be added or removed in order to balance the imbalance or misalignment respectively.

The features and advantages described below in relation to the first aspect of the invention apply accordingly to the further aspects of the invention and vice versa.

In one advantageous embodiment, the drivetrain test bench comprises a support apparatus for supporting the load unit and/or the drive unit, whereby the piezoelectric force sensor is configured and arranged so as to measure a reactive force between the load unit and the support apparatus and/or the drive unit and the support apparatus.

In this embodiment, the force sensor is arranged between the drive unit and the load unit and/or between the drive unit and the support apparatus. The force in this exemplary embodiment is therefore measured in relation to a spatially fixed reference system, namely the drivetrain test bench as such or a base plate of the drivetrain test bench respectively. Depending on how the load unit or the drive unit are mounted on the support apparatus, a piezoelectric force sensor having only one piezo element with transversal effect, longitudinal effect or even shear effect can thereby be used. This type of force sensor arrangement does not substantially change a rotating mass of the shaft assembly.

In a further advantageous embodiment of the drivetrain test bench, the piezoelectric force sensor is a multi-component force sensor having multiple piezoelectric measuring elements. This enables the force sensor to realize a particularly precise measurement.

In a further advantageous embodiment of the drivetrain test bench, the piezoelectric measuring elements are configured and arranged between a first section of the shaft assembly and a second section of the shaft assembly such that the piezoelectric measuring elements can measure a force, in particular a shear force and/or a compressive force, between the first section and the second section. Preferably, the measuring elements are thereby arranged at different positions around the rotational axis. Further preferably, the measuring elements are arranged in a flange of the drivetrain test bench.

Measuring directly in or on the shaft assembly enables a particularly simple measuring arrangement to be realized.

In a further advantageous embodiment of the drivetrain test bench, same comprises means for adjusting a mass of the shaft assembly or drivetrain respectively on the basis of the detected imbalance and/or misalignment in order to reduce or eliminate the detected imbalance/misalignment.

Such means can preferably be swarf machines, laser machines which remove or deposit mass, or joiner machines.

Should the mass of the shaft assembly be adjusted by changing the mass distribution, this can advantageously ensue by means of an apparatus which changes the position of a movable element of the shaft assembly or changes the shape of the shaft assembly, e.g. bending it.

The detected imbalance respectively misalignment can thus be balanced without needing to dismantle and rework the shaft assembly or drivetrain respectively.

Figure 2:
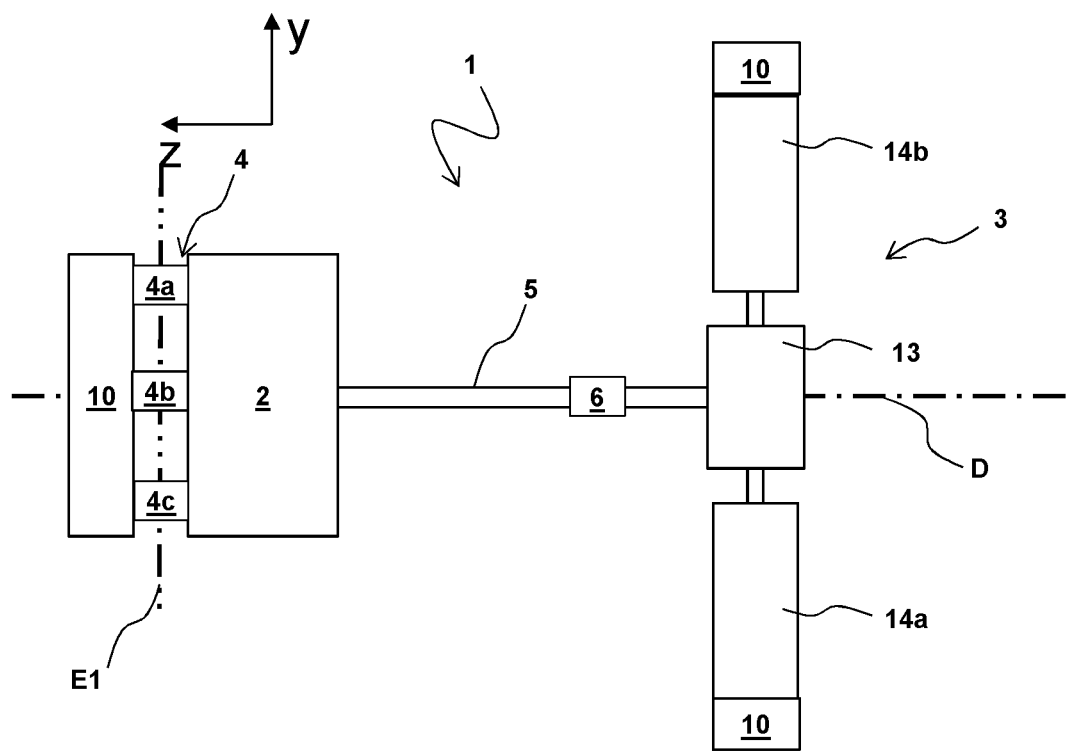
Figure 3:
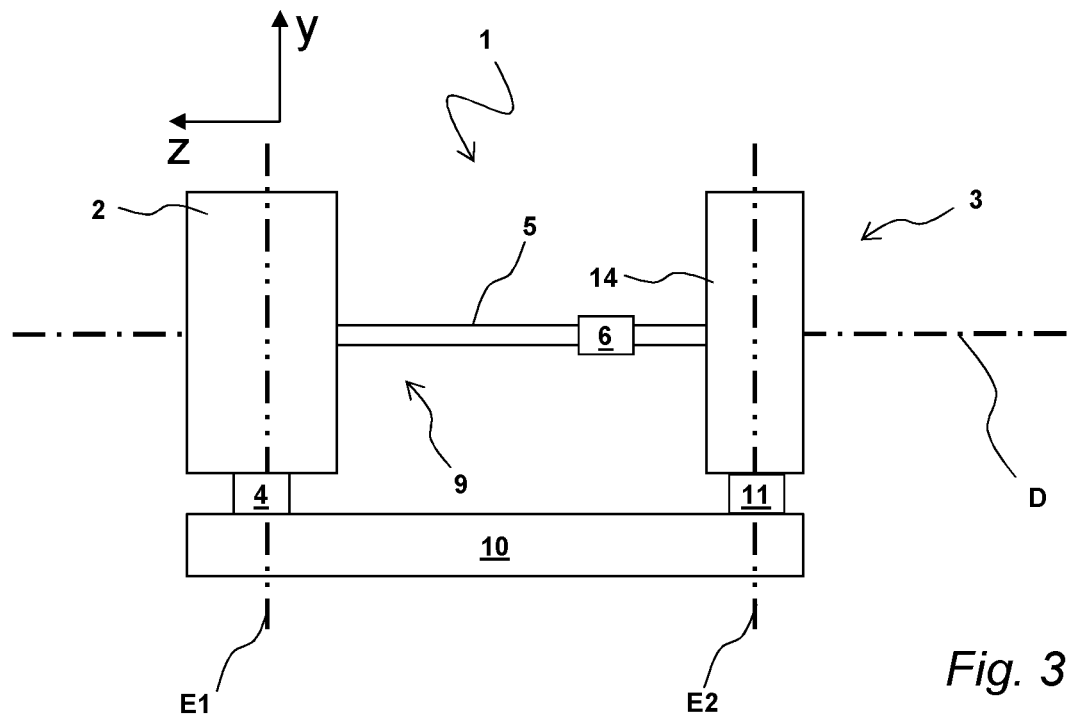
Figure 4:
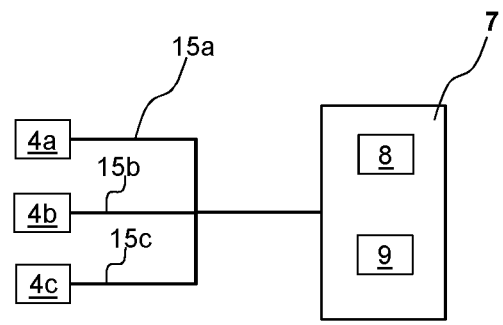

Further advantages and features will become apparent from the following description of preferred exemplary embodiments in conjunction with the figures. The figures show at least partially schematically:

FIG. 1 a first exemplary embodiment of a drivetrain test bench on which a method for detecting an imbalance and/or a misalignment can be implemented;

FIG. 2 a second exemplary embodiment of a drivetrain test bench on which a method for detecting an imbalance and/or a misalignment can be implemented;

FIG. 3 a third exemplary embodiment of a drivetrain test bench on which a method for detecting an imbalance and/or a misalignment can be implemented;

FIG. 4 a detail of the test benches according to FIG. 1, 2 or 3; and

Figure 5:
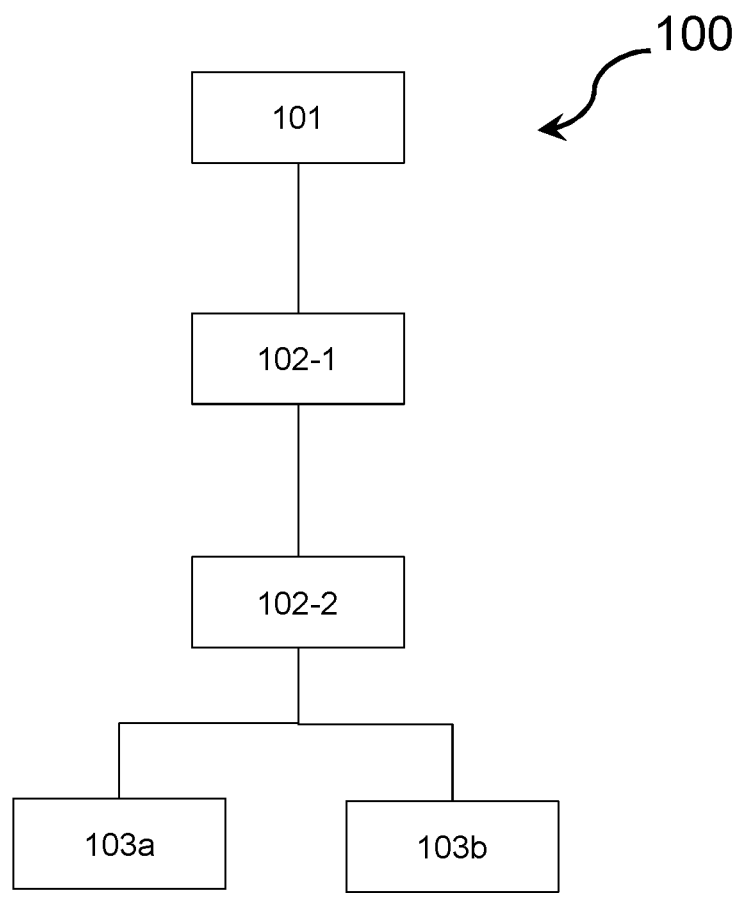

FIG. 5 an exemplary embodiment of a method for detecting an imbalance and/or misalignment.

FIG. 1 shows a first exemplary embodiment of a drivetrain test bench 1 on which, in addition to calibration or application testing, it is possible to detect imbalances and/or misalignments. In particular, the imbalance and/or misalignment can be detected during operation of the test bench.

Among other things, the drivetrain test bench 1 comprises load units or respectively dynos 14a, 14b able to be non-rotationally connected to an output of a drivetrain, as shown in FIG. 1.

Furthermore, the drivetrain test bench 1 preferably comprises an incremental encoder 6 configured to measure a rotational angle of the shaft assembly 5a, 5b. The function of an incremental encoder 6 is known from the prior art; it can in particular determine the angle of rotation of the shaft assembly 5a, 5b or determine a change in the angle of rotation and/or direction photoelectrically, magnetically and/or by means of sliding contacts.

Moreover, the drivetrain 1 preferably comprises a piezoelectric force sensor 4 which in turn preferably comprises a plurality of piezoelectric measuring elements; three piezoelectric measuring elements 4a, 4b, 4c in FIG. 1. In the exemplary embodiment according to FIG. 1, the piezoelectric measuring elements are arranged on a measuring flange 12 which can be part of the drive test bench 1 or the drivetrain 3.

The measuring flange connects a first shaft section 5a with a second shaft section 5b of the shaft assembly 3. The shaft assembly 5a, 5b rotates around a rotational axis D, which is indicated in FIG. 1 by a dashed/dotted line.

The drive unit 2 can be both a component of the drivetrain test bench 1 or of the drivetrain 3, depending on which components of a drivetrain 3 are to be tested on the drivetrain test bench 1.

In the exemplary embodiment shown in FIG. 1, the drivetrain 3 comprises the drive unit 2, the shaft assembly 5a, 5b, a differential 13 as well as axial segments (no reference numerals). A flow of power can be transmitted from the drive unit 2 to the load units 14a, 14b via the first shaft section 5a, the measuring flange 12, the first piezoelectric force sensor, the differential 13 and the axial segments.

The test bench 1 further comprises a support apparatus 10 on which is mounted the drive test bench as a whole, individual elements of the drivetrain test bench 1 and/or even the drivetrain 3. The support apparatus 10 can thereby comprise mechanical structures for supporting the individual elements, e.g. on the floor of a testing hall. Further preferably, the support apparatus 10 can comprise a base plate or be designed as such.

In the exemplary embodiment shown in FIG. 1, at least the drive unit 2 and the power units 14a, 14b are supported by the support apparatus 10.

The power flow, which is preferably generated by the drive unit 2, produces a force flow which, in the exemplary embodiment shown in FIG. 1, extends from the support device 10 in turn back to the support device 10 via the drive unit 2, the drivetrain 3 and the load units 14a, 14b. The support apparatus 10 thereby provides the reactive forces in each case for supporting the drive unit 2 and the load units 14a, 14b.

The measuring elements 4a, 4b, 4c are preferably configured and designed to measure forces in the E1 plane; i.e. a plane parallel to the XY plane of the depicted reference system. The first force sensor 4 preferably comprises piezo elements 4a, 4b, 4c which utilize the piezoelectric shear effect. In the exemplary embodiment shown, forces or respectively torques on the measuring flange 12 are introduced into the piezo elements 4a, 4b, 4c via the end faces of the measuring elements 4a, 4b, 4c. The end faces of the piezo elements 4a, 4b, 4c are thereby preferably frictionally connected to a surface of the measuring flange 12.

Upon a force in the X direction and/or a force in the Y direction of the reference system on the measuring flange 12, the piezoelectric measuring elements 4a, 4b, 4c generate corresponding measurement signals by means of the piezoelectric shear effect. The same applies when a torque acting in the Z direction is applied to the measuring flange 12.

Alternatively or additionally, the measuring elements 4a, 4b, 4c can effect a force measurement perpendicular to the first plane E1. To that end, the measuring elements 4a, 4b, 4c preferably utilize the piezoelectric longitudinal effect or the piezoelectric transverse effect. If forces are measured in the first plane E1 as well as perpendicular thereto, there are preferably measuring elements able to measure forces in the Z direction as well as measuring elements able to measure forces in the X or XY plane. Further preferably, each of the measuring elements 4a, 4b, 4c comprises at least two piezoelectric elements which are connected in series with respect to the flow of force, whereby a first piezoelectric element utilizes the piezoelectric shear effect and a second piezoelectric element utilizes the piezoelectric transverse or longitudinal effect.

FIG. 2 shows a second exemplary embodiment of a test bench 1, by means of which an imbalance and/or misalignment of a shaft assembly can be detected during test bench operation.

The test bench 1 of the second exemplary embodiment from FIG. 2 substantially differs from the first exemplary embodiment of FIG. 1 in that the first force sensor 4 is not arranged in the flow of power between the drive unit 2 and the load units 14a, 14b but rather between the support apparatus 10 and the drive unit 2.

With this arrangement, the first force sensor 4 measures the reactive force which the support apparatus 10 exerts on the drive unit 2 when a torque occurs between the shaft assembly 5 and the drive unit 2.

As depicted in FIG. 2, the force sensor 4 can thereby be preferably supported in the axial direction of the rotational axis D. In the same manner, however, the drive unit 2 in the top plan view as per FIG. 2 can also be supported by the force sensor 4 laterally or downwards or upwards. Depending on how the piezoelectric measuring elements 4a, 4b, 4c engage with the drive unit 2, use is then made of elements having a piezoelectric shear effect, piezoelectric longitudinal or transverse effect or, as already exemplified in FIG. 1, having two different effects.

Forces are also preferably measured in the E1 plane and/or perpendicular to the E1 plane in the exemplary embodiment according to FIG. 2.

It is also possible to combine the exemplary embodiment according to FIG. 1 with the second exemplary embodiment according to FIG. 2: Thus, the second exemplary embodiment could for example also comprise a measuring flange 12 on which a further piezoelectric force sensor is arranged. This second piezoelectric force sensor could then define a second plane for measuring forces and/or torques.

Moreover, there could be further piezoelectric force sensors for measuring the reactive forces on the load units 14a, 14b and these additional piezoelectric force sensors could also support preferably the respective load unit 14a, 14b vis-à-vis the support apparatus, in particular vis-a-vis a ground or base plate, so that here, too, the reactive forces between the load units 14a, 14b and the support apparatus 10 could be measured.

The measurement of reactive forces according to FIG. 2 comprises the advantage, over directly measuring forces in the shaft assembly 5, of the respective force sensor 4 having no influence on the moment of inertia and the shaft assembly balance.

A third exemplary embodiment of a drivetrain test bench by means of which an imbalance and/or a misalignment of a shaft assembly can be detected is shown in FIG. 3.

In order to simplify the illustration, the drivetrain 3 only exhibits one shaft assembly 5 as well as one drive unit 2 as applicable. Just as in the exemplary embodiments according to FIGS. 1 and 2, however, this drivetrain can also comprise further elements, in particular a gear mechanism or differential respectively, axial segments, etc. In contrast to the exemplary embodiments according to FIGS. 1 and 2, the third embodiment comprises a first force sensor 4 and a second force sensor 11, the measuring element of which can only measure a force in the respective E1/E2 plane.

If FIG. 3 is viewed as a top plan view from above, the force sensors 4, 11 then measure a horizontal force in measuring plane E1 or E2 respectively. If FIG. 3 is viewed as a top plan view from the side, the force sensors 4, 11 measure a vertical force.

As will be clarified further below, such an arrangement in conjunction with the angular measurement of the incremental encoder 6 enables detecting a static and/or a dynamic imbalance since it rotates and can therefore be measured periodically in any spatial direction extending radially to the axis of rotation. On the other hand, a misalignment cannot be detected when it generates a force/bending moment in the ZX plane; i.e. perpendicular to the measuring direction of the two force sensors 4, 11.

Yet it could also be provided in this exemplary embodiment for the respective force sensor 4, 11 to comprise two elements connected in series with respect to the force flow so that two different measuring directions, particularly two measuring directions orthogonal to one another, are possible. In particular, these measuring directions could be aligned in the Y and X direction. A force in the Z direction can also be measured by means of a third piezo element in the measuring elements of the force sensors 4, 11.

FIG. 4 shows a detail of a drivetrain test bench 1.

The piezoelectric force sensor 4 is thereby connected to a signal processing device 7 by means of a signal line. Preferably, as depicted in FIG. 4, the individual piezo elements can be connected to the signal processing device 7 by means of individual signal lines 15a, 15b, 15c.

The signal processing device 7 moreover preferably comprises means 8 for detecting an imbalance in the shaft assembly. The measured value progression of the first force measurement and/or the measured value progression of the second force measurement by means of the second piezoelectric force sensor 11 is preferably used in detecting the imbalance. An angle of rotation of the shaft assembly 5 measured by the incremental encoder 6 in the measured value progression is furthermore preferably used in detecting the imbalance and/or misalignment.

Further preferably, the signal processing device 7 comprises means 9 for detecting a misalignment of the shaft assembly. Such a misalignment can in particular be detected on the basis of a measured value progression of the first force measurement by the first piezoelectric force sensor 4. In contrast to an imbalance which rotates at a rotational frequency of the shaft assembly 5 in the reference system, a force or a torque caused by misalignment remains stationary in relation to a spatially fixed reference system.

FIG. 5 shows an exemplary embodiment of a method for detecting an imbalance and/or a misalignment which can be implemented on the previously described exemplary embodiments of a drivetrain 1 of FIGS. 1 to 4. A power transmission is established between a drive unit 2 and load units 14a, 14b. Either the drive unit 2 thereby drives the load units 14a, 14b via the shaft assembly 5 or vice versa.

While said transmission of power continues, the first force sensor performs a first force measurement in the first plane E1 or perpendicular to the first plane E1, (102-1). The direction in which the force is measured thereby depends on which forces and torques are to be measured. However, the respective plane in which the force measurement ensues, or in relation to which the force measurement ensues respectively, does not need to be perpendicular to the rotational axis D. Should that be the case, only that portion of the force measurement which is aligned parallel to the rotational axis D or orthogonal to the rotational axis D is always factored into the various calculations.

Should a dynamic imbalance be detected, a measurement is preferably taken in a second plane E2, which differs from the first plane E1, as shown for example in FIG. 3 with respect to the third exemplary embodiment of the drivetrain test bench 1, (102-2).

The measured value progression of the first force measurement and/or the second force measurement and preferably a shaft assembly rotational angle determination is subsequently analyzed in order to be able to detect a static imbalance and/or a dynamic imbalance, (103a). Additionally or alternatively, the measured value progressions are analyzed in order to be able to detect a misalignment of the shaft assembly, (103b).

Preferably, balancing masses are positioned on the drivetrain 3 in a further work step, in particular directly on the shaft assembly 5, 5a, 5b, in order to bring the principal axis of inertia of the drivetrain 3 back into alignment with the rotational axis D, shift the center of mass of the drivetrain 3 to the rotational axis and/or align the principal axis of inertia parallel, in particular coaxially, to the rotational axis D.

A static imbalance can be detected in work step 103a as follows:

A radial force component $F_r(t)$ of the following equation can be determined via two-dimensional force measurement in a bearing point of the shaft assembly 5, 5a, 5b or directly on the shaft assembly 5, 5a, 5b, in particular on the drive, the output or an intermediate bearing:

$$F_r(t) = \sqrt{F_x(t) + F_y(t)}$$

By reducing to the first harmonic component of $F_r(t)$, for example via a narrow-band bandpass with the frequency response $H(s)$ at mid-band frequency $f_0 = f_{rotation}$, the radial force component is isolated as follows:

$$F_U(t) = H(s) \cdot F_r(t)$$

The rotating radial force component corresponds to the rotating unbalance force $F_u$ and provides information about the harmonic excitation of vibrations that can effect mechanical damage in the drivetrain 1 and undesired bearing loads. Preferably, averaging over a sufficient number of time increments $t_n$ results in a constant absolute unbalance value as follows:

$$\overline{F_U} = \frac{1}{n}\sum_{i=0}^{n} F_U(t_i)$$

Static imbalance can be offset by positioning balancing masses in or near planes E1, E2 of the force measurement. The balancing mass (mass of equilibrium) $m_a$ is calculated from the unbalance force $F_u$, the radial position $r_A$ at which the balancing mass $m_a$ is to be placed, and the angular sweep speed $\omega_{mess}$ of the shaft assembly 5, 5a, 5b. The following applies to the balancing force $F_A$:

$$F_A = \overline{F_U} = m_A \cdot r_A \cdot \omega_{mess}^2$$

The balancing mass placement results in the center of mass $m_a$ of the shaft assembly coinciding with the axis of rotation and the summation of all the bearing forces being zero.

Alternatively or additionally to the positioning of a balancing mass $m_a$, an imbalance can also be offset by removing mass on the drivetrain 3 or in the shaft assembly 5, 5a, 5b respectively.

With respect to a dynamic imbalance, the balancing masses are accordingly determined as per the method for determining a static imbalance, although balancing masses must be situated in at least two different planes. The masses thereby stem from the axial distance of the balancing measurement plane E1, E2, among other things. When the first force sensor 4 can detect both forces in the E1 plane as well as forces perpendicular to the E1 plane at the same time, a single measurement plane E1 is sufficient in order to detect a dynamic imbalance.

The force components $F_x(t)$ and $F_y(t)$ for determining imbalances and the force components $F_z(t)$ as well as torque components $M_x(t)$ and $M_y(t)$ for determining dynamic imbalances and a misalignment can be obtained in an intrinsically known manner using the specific arrangement of the preferential directions of the individual measuring elements 4a, 4b, 4c or their piezo elements respectively.

Other methods of determining these parameters can also be utilized. For example decomposition, particularly an orthogonal decomposition of the measurement signals of the individual measuring elements 4a, 4b, 4c or the forces $F_1, \ldots, F_i$ derived; i.e. measured, from the measurement signals.

For example, the parameters $M_z, F_X, F_Y$ to be determined are thereby the solution of a set of equations, wherein an equation as follows applies to each measurement signal:

$$S1 = a_{11} \cdot M_z + a_{12} \cdot Fx + a_{13} \cdot Fy$$

$$S2 = a_{21} \cdot M_z + a_{22} \cdot Fx + a_{23} \cdot Fy$$

$$S3 = a_{31} \cdot M_z + a_{32} \cdot Fx + a_{33} \cdot Fy$$

$$SN = a_{N1} \cdot M_z \ldots$$

S1, S2, ... Si, ..., SN are thereby the measurement signals of the individual measuring elements 4a, 4b, 4c, ... 2, N. Each coefficient a depends on several factors such as, for example, the respective position of the measuring element 4a, 4b, 4c, ... 4i, 4N and the orientation of the respective preferential direction in the reference system, sensitivity of the respective measuring element 4a, 4b, 4c, ..., 4i, ..., N, and a possible loss of signal due to force shunt from fastening means.

Solving such a set of equations for the torque $M_z$, a first transverse force component $F_x$ and a second transverse force component $F_y$ requires measurement signals from at least three measuring elements 4a, 4b, 4c with preferential directions aligned so as to lie in a single plane. Furthermore, at least two of the preferential directions must be aligned neither parallel nor antiparallel.

For this described general case of N=3; i.e. with three measuring elements 4a, 4b, 4c, the solution to the above-depicted set of equations is clear. If further measuring elements are added to the measuring system 1, the equation set is overdetermined with three parameters $M_z, F_x, F_y$ to be determined, albeit the measuring accuracy can be improved again.

In the case of N=4, four different sets of equations F (S1, S2, S3), F (S1, S2, S4), F (S1, S3, S4), F (S2, S3, S4) can be constructed. The values determined for the individual parameters $M_z, F_x, F_y$ to be determined can then be totaled and averaged; i.e. divided by four in the case of four measuring elements 4a, 4b, 4c, ..., 4i, ..., 4N. In similar manner, an overdetermined set of equations F (S1, S2 ..., SN) can be constructed to be solved by means of a minimization function.

Once a general solution has been found for the set of equations, calculation of the parameters $M_z, F_x, F_y$ to be determined can be reduced to a matrix multiplication having three rows and as many columns provided as measurement signals S1, S2, S3, ... SN. The matrix elements or respectively coefficients form the respective contributions of the individual sensors to the parameters $M_z, F_x, F_y$ to be determined.

$$\begin{pmatrix} Fx \\ Fy \\ MB \end{pmatrix} = K \begin{pmatrix} c11 & c12 & c13 & \ldots c1N \\ c21 & c22 & c23 & \ldots c2N \\ c31 & c32 & c33 & \ldots c3N \end{pmatrix} \begin{pmatrix} s1 \\ s2 \\ s3 \\ \ldots sN \end{pmatrix}$$

Breaking down the measurement signals S1, S2, ... S1, ..., SN into components which contribute to the respective parameters $M_z, F_x, F_y$ to be determined requires knowing the position of the measuring elements 4a, 4b, 4c, ..., 4i, ..., 4N and the orientation of the preferential directions.

The geometric parameters can be determined from a constructional drawing of the drivetrain test bench 1 and from the knowledge of the preferential directions of the measuring elements 4a, 4b, 4c, ..., 2i, ..., 2N.

However, the orientation of the preferential directions of the measuring elements 4a, 4b, 4c, ..., 4i, ..., 4N can also be determined by measuring the preferential directions via calibration measurement. Preferably, the force sensor 4, 11 is clamped between two flat plates to that end. In a subsequent step, external transverse forces having a known direction are applied. The preferential direction of the measuring elements 4a, 4b, 4c, ..., 4i, ..., 4N in the plane spanned by the preferential direction of the measuring elements 4a, 4b, 4c, ..., 4i, ..., 4N can be determined from the magnitude of the individual measurement signals S1, S2, ... Si, ..., SN in relation to the magnitude and direction of the transverse forces introduced.

Similarly, when the preferential directions of the individual measuring elements 4a, 4b, 4c, ..., 4i, ..., 4N are known, the distance of the measuring elements 4a, 4b, 4c, ..., 4i, ..., 4N from the rotational axis D can be determined by applying a defined torque $M_z$ and measuring the individual measurement signals S1, S2, ... Si, ..., SN.

The above-described exemplary embodiments are merely examples which are in no way to be limiting of the scope of protection nor the application and configuration. Rather, the preceding description affords one skilled in the art a guideline for the implementation of at least one exemplary embodiment, whereby various modifications can be made, in particular with regard to the function and arrangement of the described components without departing from the protective scope resulting from the claims of such and equivalent combinations of features. In particular, individual exemplary embodiments can be combined with one another.

LIST OF REFERENCE NUMERALS 1 drivetrain test bench
2 drive unit
3 drivetrain
4 first piezoelectric force sensor
4a, 4b, 4c piezoelectric measuring element
5, 5a, 5b shaft assembly
6 incremental encoder
7 signal processing device
8 means for detecting an imbalance
9 means for detecting a misalignment
10 support apparatus
11 second piezoelectric force sensor
12 measuring flange
13 differential/gear mechanism
14a, 14b load unit
15a, 15b, 15c signal lines

What is claimed is:

1. A method for detecting a misalignment of a shaft assembly of a drivetrain in operation on a test bench,
   wherein a first piezoelectric force sensor is arranged in a flow of force generated by a transmission of power between a load unit of the test bench and a drive unit of one of the drivetrain or the test bench, and which is transmitted by the shaft assembly,
   wherein the first piezoelectric force sensor performs a first force measurement perpendicular to a first plane as is intersected by a rotational axis of the shaft assembly, and
   wherein a measured value progression of the first force measurement is analyzed in order to detect a misalignment of the shaft assembly.

2. The method according to claim 1, wherein the first piezoelectric force sensor additionally performs the first force measurement in the first plane, and wherein the measured value progression of the first force measurement and a value progression associated with a measured value progression of a rotational angle determination for the shaft assembly are analyzed in order to detect an imbalance of the shaft assembly.

3. The method according to claim 2, wherein the measured value progression of the first force measurement is analyzed in order to detect the imbalance relative to the rotational axis or a center of mass of the shaft assembly.

4. The method according to claim 3, wherein a second force measurement is performed in a second plane, which differs from the first plane and is intersected by the rotational axis of the shaft assembly of the drivetrain via a second piezoelectric force sensor in the flow of force, wherein the imbalance of the shaft assembly relative to the center of mass is additionally determined on the basis of a measured value progression of the second force measurement.

5. The method according to claim 4, wherein the first or second piezoelectric force sensor is a multi-component force sensor comprising multiple piezoelectric measuring elements.

6. The method according to claim 5, wherein force components and torque components are determined by a set of equations on the basis of measurement signals of the individual piezoelectric measuring elements.

7. The method according to claim 6, wherein measurement signals of the individual piezoelectric measuring elements are broken down into portions contributing to the respective force components and/or torque components to be derived.

8. The method of claim 6, wherein all the contributions of the individual piezoelectric measuring elements to the respective force components and/or torque components to be determined are taken into account.

9. The method according to claim 4, wherein a reactive force in relation to the flow of force between the load unit and a support apparatus or between the drive unit and the support apparatus is measured in the first force measurement or in the second force measurement.

10. The method of claim 4, wherein the second plane is at least substantially perpendicular to the rotational axis, and the first force measurement is performed in the first plane.

11. The method according to claim 3, wherein a mass of the shaft assembly is adjusted on the basis of the imbalance detection.

12. A computer program containing instructions which, when executed by a computer, prompt it to execute the steps of a method according to claim 1.

13. A computer-readable medium on which a computer program according to claim 12 is stored.

14. The method of claim 1, wherein the first force measurement is performed perpendicular to the first plane, and the first plane is at least substantially perpendicular to the rotational axis.

15. A drivetrain test bench comprising:
   a load unit connectable to a drivetrain to be tested;
   a first piezoelectric force sensor arranged in a flow of force relative to the drivetrain to be tested and configured to perform a first force measurement perpendicular to a first plane as is intersected by a rotational axis of a shaft assembly of the drivetrain;
   an incremental encoder configured to determine an angle of rotation for the shaft assembly;
   a signal processing device configured to detect
   a misalignment of the shaft assembly on the basis of a measured value progression of the first force measurement.

16. The drivetrain test bench of claim 15, wherein the first piezoelectric force sensor is additionally configured to perform the first force measurement in the first plane, and the signal processing device is additionally configured to detect an imbalance of the shaft assembly on the basis of the measured value progression of the first force measurement and a value progression associated with a measured value progression of a rotational angle determination for the shaft assembly.

17. The drivetrain test bench according to claim 16, further comprising:
   a second piezoelectric force sensor arranged in the flow of force relative to the drivetrain to be tested and configured to perform a second force measurement in a second plane, which differs from the first plane and is intersected by the rotational axis of the shaft assembly of the drivetrain, wherein the signal processing device is further configured to determine the imbalance of the shaft assembly in relation to a center of mass of the shaft assembly on the basis of a measured value progression of the second force measurement.

18. The drivetrain test bench according to claim 17 further comprising:
a support apparatus for supporting at least one of the load unit or a drive unit, wherein at least one of the first or the second piezoelectric force sensors is configured and arranged so as to measure a reactive force at least one of between the load unit and the support apparatus or between the drive unit and the support apparatus.

19. The drivetrain test bench according to claim 17, wherein the first or the second piezoelectric force sensor does or respectively does not change a rotating mass of the shaft assembly.

20. The drivetrain test bench according to claim 17, wherein the first or the second piezoelectric force sensor is a multi-component force sensor having multiple piezoelectric measuring elements.

21. The drivetrain test bench according to claim 20, wherein the piezoelectric measuring elements are arranged between a first section of the shaft assembly and a second section of the shaft assembly such that the piezoelectric measuring elements can measure a force between the first section and the second section.

22. The drivetrain test bench of claim 21, wherein the force that the piezoelectric measuring elements can measure is a shear force and/or a compressive force.

23. The drivetrain test bench according to claim 20, wherein the piezoelectric measuring elements are arranged at different positions around the rotational axis of the shaft assembly of the drivetrain.

24. The drivetrain test bench according to claim 17, further comprising:
at least one element for adjusting a mass of the shaft assembly on the basis of the detected imbalance.

25. The drivetrain test bench of claim 17, wherein the second plane is at least substantially perpendicular to the rotational axis.

26. The drivetrain test bench of claim 15, wherein the first force measurement is performed perpendicular to the first plane, and the first plane is at least substantially perpendicular to the rotational axis.

* * * * *